(12) United States Patent
Adams

(10) Patent No.: US 7,341,244 B1
(45) Date of Patent: Mar. 11, 2008

(54) HYDRAULIC ANTIVIBRATION SUPPORT

(75) Inventor: Blake Adams, Comstock Park, MI (US)

(73) Assignee: Paulstra CRC, Grand Rapids, MI (US)

( * ) Notice: Subject to any disclaimer, the term of this patent is extended or adjusted under 35 U.S.C. 154(b) by 0 days.

(21) Appl. No.: 11/678,887

(22) Filed: Feb. 26, 2007

(51) Int. Cl.
*F16F 5/00* (2006.01)

(52) U.S. Cl. .............................. 267/140.13

(58) Field of Classification Search ........... 267/140.11, 267/140.13, 140.14, 35; 248/562; 180/300
See application file for complete search history.

(56) References Cited

U.S. PATENT DOCUMENTS

| | | | |
|---|---|---|---|
| 4,399,987 A * | 8/1983 | Cucelli et al. ......... | 267/140.13 |
| 4,645,188 A | 2/1987 | Jordens | |
| 4,921,049 A * | 5/1990 | Kaiser et al. .......... | 267/140.13 |
| 5,127,636 A * | 7/1992 | Spaltofski ............... | 267/140.13 |
| 5,782,462 A * | 7/1998 | Hein et al. .............. | 267/140.13 |
| 5,964,456 A * | 10/1999 | Someya .................. | 267/140.13 |
| 6,386,527 B2 * | 5/2002 | Oberle ................... | 267/140.14 |
| 7,117,969 B2 * | 10/2006 | Miyamoto et al. .......... | 180/291 |
| 2004/0245690 A1 | 12/2004 | Winkler et al. | |

FOREIGN PATENT DOCUMENTS

| | | |
|---|---|---|
| DE | 4139046 | 6/1993 |
| DE | 4324832 | 1/1995 |
| DE | 102004035677 | 3/2006 |
| EP | 0 409 707 B1 | 4/1994 |
| EP | 0 410 896 B1 | 4/1994 |
| EP | 0 511 907 B1 | 1/1995 |
| EP | 0 575 250 B1 | 5/1996 |
| EP | 1 447 591 B1 | 12/2005 |
| WO | WO-2004/067994 | 8/2004 |
| WO | WO-2005/052407 A1 | 6/2005 |

* cited by examiner

*Primary Examiner*—Christopher P. Schwartz
(74) *Attorney, Agent, or Firm*—Miller, Matthias & Hull

(57) ABSTRACT

A hydraulic anti-vibration support comprises at least one elastomer spring body made of a high temperature-resistant material which connects a first rigid strength member and a second rigid strength member. The first rigid strength member includes a piston which comprises a rod terminated by an end member, and a second rigid strength member has an opening which is traversed by said piston. A liquid-filled module is mounted inside a casing which is secured to the second rigid strength member, and includes a working chamber defined in part by a substantially dome shaped elastomer wall which has a central area in contact with the end member of the piston without any mechanical securing. Preferably, the high temperature-resistant material comprises silicone and is in non-adhesive contact with the first and the second rigid strength members.

17 Claims, 3 Drawing Sheets

US 7,341,244 B1

HYDRAULIC ANTIVIBRATION SUPPORT

FIELD OF THE INVENTION

The present invention relates to hydraulic anti-vibration supports intended to interconnect first and second rigid elements, respectively such as an engine and its supporting chassis, that are to be united in order to damp and filter vibration between said elements at least along a main vibration axis.

BACKGROUND OF THE INVENTION

More particularly, amongst such devices, the invention relates to those which comprise:

a first rigid strength member for securing to the first rigid element, including a piston which comprises a rod substantially disposed coaxially along the main axis and an end member disposed at the end of the rod remote from the first rigid element, said end member extending substantially radially;

a second rigid strength member for securing to the second rigid element, having a first side which faces the first rigid strength member and a second side in the opposite direction relative to the main axis and being provided with an opening traversed by said piston;

at least one first elastomer spring body connecting the first and the second rigid strength members, disposed on the first side of the second rigid strength member, and always in a state of compression to accommodate a first load substantially along the main axis;

resilient means adapted to connect the first and the second rigid strength members to prevent a distance between the first and the second rigid strength members from exceeding a predetermined upper limit which corresponds to an upper end position for the displacement of the piston;

a casing secured to the second rigid strength member and extending on the second side of said strength member; and a liquid-filled module mounted inside said casing, comprising a liquid-filled working chamber which is delimited on one side by a flexible wall provided between said working chamber and the piston, said flexible wall having a central area interconnected to the end member of the piston, further comprising a liquid-filled compensation chamber which is put into communication with the working chamber via a constricted passage of a partition member that separates these two chambers.

Such supports are already known, in particular from the patent application DE-A-4139046. Such known supports suffer a number of drawbacks, including a lack of resistance to high temperatures above 150° C., a relatively high complexity and a relatively high cost.

SUMMARY OF THE INVENTION

To remedy these drawbacks, a hydraulic anti-vibration support which can be durably exposed to high temperatures typically above 160° C. is provided.

To this end, according to the invention, in a support of the kind in question, at least one first elastomer spring body is made of a high temperature-resistant material. Besides, the liquid-filled working chamber is defined at least in part by a substantially dome shaped elastomer wall which has a central area in contact with the end member of the piston without any mechanical securing to said end member.

By providing such a structure, there is no need for a fastening piece attached to the elastomer wall, which simplifies the manufacturing of the liquid-filled module and allows to improve the thermal insulation provided by the elastomer wall between the piston and the damping liquid.

In preferred embodiments of the hydraulic anti-vibration support of the invention, recourse may optionally be had to one or more of the following dispositions:

the first elastomer spring body includes a substantially frusto-conical main part which is in contact with the first and second rigid strength members, and the second rigid strength member includes abutment means which hold in place an inner annular edge part of said substantially frusto-conical main part, so that a downward sliding motion of said main part against the second rigid strength member upon compression of the first elastomer spring body during the service life of the support is impeded or greatly limited;

the substantially frusto-conical main part of the first elastomer spring body is in non-adhesive contact with the first and second rigid strength members;

the substantially frusto-conical main part is supported by a substantially frusto-conical inner wall of the second rigid strength member, and said inner wall extends radially inwards into an annular recess which forms said abutment means;

the thickness of the substantially dome shaped elastomer wall is defined so that the load accommodated by said elastomer wall upon compression of the wall by the piston is adapted to maintain the central area of the wall always in abutment against the end member of the piston, which allows the hydraulic damping to be engaged upon starting any downward displacement of the piston;

the elastomer wall has a thickened peripheral area moulded on a rigid annular insert, which allows to simplify the assembling of the elastomer wall in the casing of the support and to simplify the manufacturing of the casing.

In a particularly preferred embodiment of the hydraulic anti-vibration support of the invention, by avoiding the need for an adhesive securing between a first elastomer spring body and the first and second rigid strength members, there is no risk to have a deterioration of the adhesion due to a prolonged exposure to high temperatures typically above 160° C. The service life of the support is thus likely to be extended compared to a support using adhesion means exposed to such high temperatures.

BRIEF DESCRIPTION OF THE DRAWINGS

Other characteristics and advantages of the invention appear from the following detailed description of two embodiments thereof, given as a non limitative examples and with reference to the accompanying drawings, in which.

MORE DETAILED DESCRIPTION

In the figures, the same references designate elements that are identical or similar.

Figure 1:
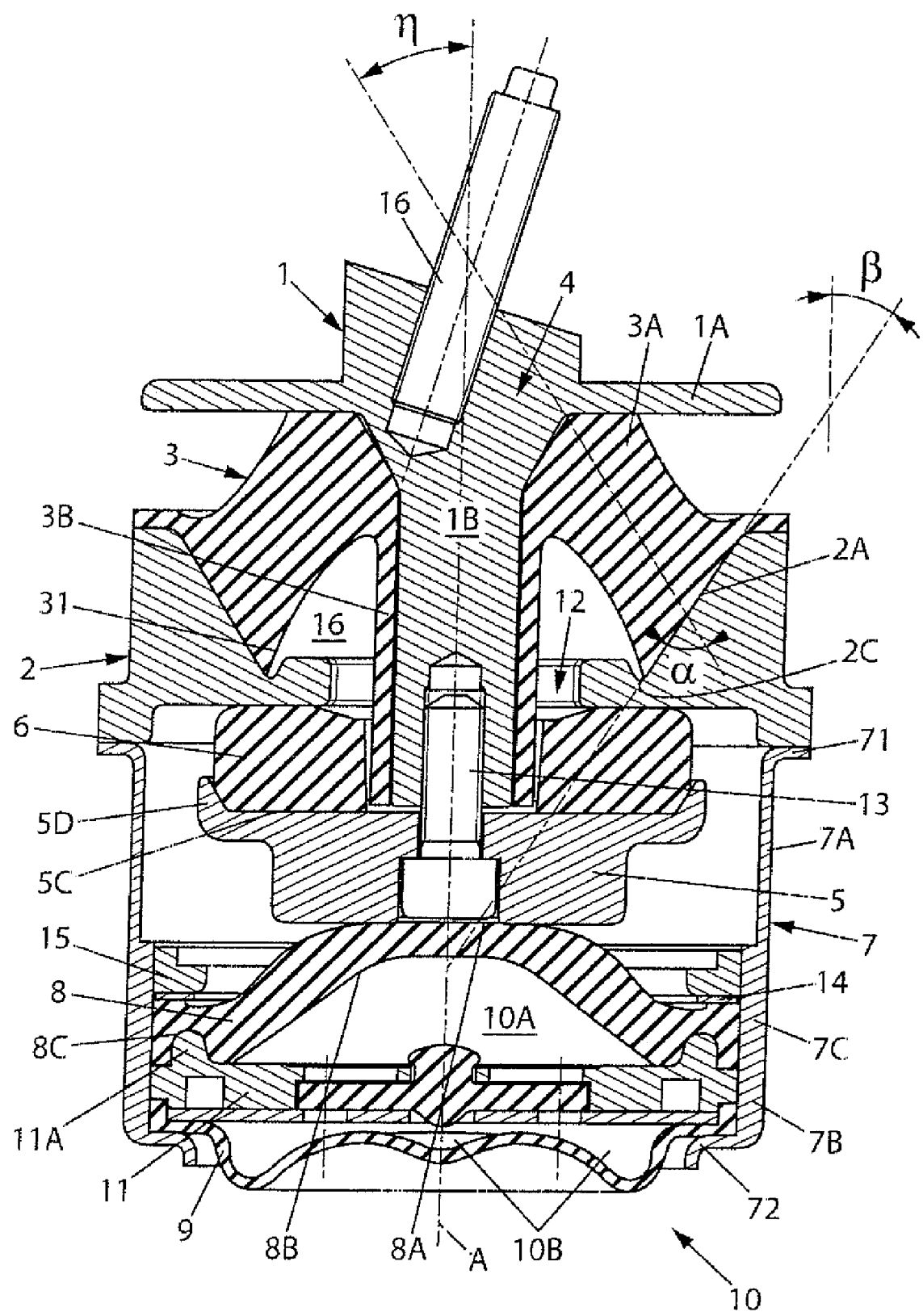
FIG. 1 is a longitudinal section view of a hydraulic anti-vibration support according to a first embodiment of the invention.

The hydraulic anti-vibration support shown in FIG. 1 comprises a first rigid strength member 1 for securing to a first rigid element such as an engine, said first rigid strength member including a rod 1B substantially disposed coaxially along the main axis A of the support and an end member 5 disposed at the end of the rod remote from the first rigid element. The end member 5 extends substantially radially, and consists substantially of a thick disc provided with a central bore whose dimensions are adapted to accommodate the entire head of a bolt 13. The bolt is disposed coaxially with the main axis A and secures the end member 5 to the lower end of the rod 1. A piston 4 is formed by the rod 1B and the end member 5. The first rigid strength member 1 further includes an annular part 1A substantially perpendicular to the main axis A and which is formed in one piece with the rod 1B. The upper part of the rod 1B has a bore which is provided to receive a bolt 16, for securing to a first rigid element such as an engine.

The hydraulic anti-vibration support also comprises a second rigid strength member 2 for securing to a second rigid element such as a supporting chassis, said second rigid strength member having a first side which faces the first rigid strength member 1 and a second side in the opposite direction relative to the main axis A and being provided with an opening 12. This opening 12 is permanently traversed without contact by the rod 1B of the first rigid strength member 1, to allow a limited relative displacement between the first and second rigid strength members.

The hydraulic anti-vibration support further comprises at least one first elastomer spring body 3 to interconnect the first and second rigid strength members. This first elastomer body 3 is disposed on the first side of the second rigid strength member 2, and is always in a state of compression to accommodate a first load substantially along the main axis A. In the particular embodiment shown in FIG. 1, the anti-vibration support is represented in a state where it does not support any weight. Thus, the first elastomer spring body 3 is very slightly compressed in this state.

The first elastomer spring body 3 is made of a high temperature-resistant material, which preferably comprises silicone. By "high temperature-resistant material", it is meant a material able to withstand a prolonged exposure to temperatures typically above 160° C., and preferably up to about 210° C. The spring body 3 includes a substantially frusto-conical main part 3A and a substantially tubular extension part 3B which encircles the rod 1B.

The angle of the cone for the main part 3A varies with the fluctuation of the first load accommodated by the elastomer body 3 in the state of dynamic compression. Preferably, the angle η of this cone in a state of non compression as represented in FIG. 1 is chosen between 30° and 45° relative to the main axis. Thus, in the compression state of the first elastomer spring body 3, the load accommodated by the main part 3A of this body always exhibits an inward radial component and an upward longitudinal component. These forces in combination maintain the main part 3A in a wide annular recess which is formed by the annular part 1A and the rod 1B of the first rigid strength member 1. The elastomer spring body 3 is therefore in contact with the first rigid strength member 1 without significant sliding. In consequence, there is no need for any adhesion which would secure this elastomer body 3 to the first strength member 1.

The substantially frusto-conical main part 3A of the first elastomer spring body 3 is supported in abutment against a substantially frusto-conical inner wall 2A of the second rigid strength member 2, preferably without adhesion. The inner wall 2A extends radially inwards into an annular recess 2C into which an inner annular edge part 31 of the main part 3A engages. Since the inner annular edge part 31 abuts against the wall of the annular recess 2C, said recess constitute abutment means which hold in place the annular edge part 31 and thus impedes or greatly limits a downward sliding motion of the contacting surface of the main part 3A upon compression. The contacting surface of the first elastomer spring body 3 remains accurately positioned on the inner wall 2A of the second rigid strength member 2 during compression, and the wear of said contacting surface is very limited. If needed, a surface treatment to further limit the wear may be provided for the inner wall 2A and/or the contacting surface of the elastomer body.

Avoiding any durable adhesion between the elastomer body 3 and the first and second strength members allows the support to better withstand a prolonged exposure to high temperatures typically above 160° C. It also allows to simplify the manufacturing process of the support.

However, the assembling of the support may be easier if at least one elastomer part is stuck to a rigid part for a better mutual positioning of the parts. It may be advantageous to provide a "temporary" adhesion between some parts even though said temporary adhesion will not withstand high temperatures and will have no functioning role.

Preferably, the inner wall 2A makes an angle β, relative to the main axis A, which is comprised between 20° and 40°. It is advantageous that the angle α which is defined between the conical direction of the main part 3A and the inner wall 2A be between 75° and 90° when the elastomer spring body 3 accommodates a maximum load, without exceeding 90° so that the main part 3A may not slide upwards (i.e. radially outwards) upon compression of the first elastomer spring body 3.

The hydraulic anti-vibration support further comprises resilient means which consist in at least one second elastomer body 6 made of a high temperature-resistant material and adapted to be compressed while connecting the first and the second rigid strength members. A strong compression occurs when a distance between the first and second rigid strength members tends to a predetermined upper limit which corresponds to an upper end position for the displacement of the piston. Upon compression, the second elastomer body 6 accommodates a second load acting substantially along the main axis A in a direction opposite to the first load of the spring body 3.

In the state corresponding to FIG. 1, the second elastomer body 6 is very slightly compressed between the second rigid strength member 2 and the end member 5. Preferably, no adhesion is made between this elastomer body 6 and these members.

In the example described, the end member 5 has a substantially flat face 5C perpendicular to the main axis A, which supports the second elastomer body 6. This face 5C extends outwards into an annular shoulder 5D which radially maintains the second elastomer body 6 coaxial with the main axis A.

If a weight is applied to the first rigid strength member 1, typically after installing the device to partially support an engine, the distance between the first and second rigid strength members decreases since the first elastomer spring body 3 becomes compressed. This implies that on the second side of the second rigid strength member 2, the distance between the end member 5 and the strength member 2 increases. As there is no adhesion between the second elastomer body 6 and the strength member 2, a gap of air is formed between these two elements since the elastomer body 6 is not compressed any more.

In the specific case of sudden movements of large amplitude between the engine and the vehicle chassis (due in particular to the vehicle running over a large irregularity in the road) the energy released by the elastomer body 3 after a strong compression provides an upward displacement of the engine with a high amplitude which must be controlled so that a distance between the first and second rigid strength members does not exceed an upper predetermined limit.

As the first elastomer spring body 3 is always in a compression state, the role of the second elastomer body 6 is to absorb enough kinetic energy by being elastically compressed, so that the upward displacement of the first rigid strength member 1 is damped as the piston 4 reaches an upper position which is followed by a reverse downward displacement. In the state of elastic compression, the second elastomer body 6 accommodates a second load substantially along the main axis A in a direction opposite to the first load accommodated by the first elastomer spring body 3.

The hydraulic anti-vibration support comprises a casing 7 which is fastened to the second rigid strength member 2 on its second side. A liquid-filled module 10 is mounted inside the casing 7 and comprises a liquid-filled working chamber 10A which is defined by the space between an elastomer wall 8 and a partition member 11 secured to the casing. The elastomer wall 8 is provided between the working chamber 10A and the piston 4. It has a central area contacting the end member 5 of the piston 4, and a peripheral area secured to the casing 7. No mechanical securing is made between the elastomer wall 8 and the end member 5.

The elastomer wall 8 is adapted to accommodate a third load substantially along the main axis A in the same direction as the first load. It is substantially dome shaped, and its convexity is directed towards the piston 4. In the state corresponding to FIG. 1, the elastomer wall 8 is moderately compressed by the end member 5, so that a discoid part of its outer surface is in contact with the end member 5, this discoid part being centered on the main axis A.

When the piston 4 is displaced downwards, the elastomer wall 8 becomes more compressed, the thickness of the wall increases while the surface of its inner face 8B decreases, and this elastomer body accommodates a third load substantially along the main axis A in the same direction as the first load of the first elastomer spring body 3.

The liquid-filled module 10 further comprises a liquid-filled compensation chamber 10B on the other side of the partition member 11, which is put into communication with the working chamber 10A via a constricted passage of the partition member 11 that separates these two chambers. A second flexible wall consisting in a flexible membrane 9 closes the compensation chamber 10B.

When the piston 4 is displaced upwards just after a substantial compression of the first elastomer body 3, the third load accommodated by the elastomer wall 8 provides energy for transferring the liquid from the compensation chamber 10B to the working chamber 10A. Preferably, this third load is provided strong enough to maintain the central area of the elastomer wall 8 always in abutment against the end member 5. This configuration gives the advantage that the hydraulic damping provided by the transfer of the liquid from the working chamber 10A to the compensation chamber 10B is engaged upon starting any downward displacement of the end member 5.

The thickness of the substantially dome shaped elastomer wall 8, and other dimensions of the elastomer body 8, are parameters that can be adapted to provide the required strength for the load accommodated by this body 8, and also to provide a satisfactory thermal insulation between the end member 5 of the piston and the damping liquid.

In the embodiment shown, the flexible membrane 9 is not resilient or does not have a significant resilience. However, the flexible membrane 9 could be provided as a resilient elastomer body which would accommodate an additional effort when the volume of the compensation chamber 10B increases. Such an additional effort would complement the third load of the elastomer wall 8, thus providing more energy for transfer ring the liquid from the compensation chamber 10B to the working chamber 10A.

The elastomer wall 8 has an annular groove 8C formed in the peripheral area of its inner face 83. An annular protrusion 11A of the partition member 11 is provided to engage into the annular groove 8C. This configuration contributes to improve the tightness of the sealing of the elastomer body 8 with the partition member 11.

The casing 7 is formed by a substantially tubular wall which has first and second portions respectively 7A and 7B aligned longitudinally in the direction of the main axis A. The first portion 7A extends longitudinally into the second portion 7B opposite from the second rigid strength member 2. The second portion 7B encircles the peripheral area of the elastomer wall 8 as well as the partition member 11 and the peripheral area of the membrane 9, and has a thicker wall compared to the first portion 7A. This increased thickness is adapted to provide to the second portion 7B the stiffness which is required to withstand the outwards radial component of the maximum load accommodated by the elastomer wall 8. To that end, the first and second portions 7A and 7B respectively have substantially constant first and second respective inner diameters, the first inner diameter being greater than the second inner diameter.

The peripheral area of the elastomer wall 8 is longitudinally pressed between the partition member 11 and tightening means which are secured to the casing 7 in abutment against an annular inner shoulder 7C of the casing. These tightening means comprise an annular flange 14 and an outwardly threaded nut 15. The nut 15 is adapted to be screwed inside the first portion 7A of the casing 7 in order to longitudinally hold the annular flange 14 in abutment against the annular inner shoulder 7C.

At its bottom end, the second portion 7B of the casing 7 extends radially inwards into an annular part 72. The peripheral area of the second flexible wall provided by the membrane 9 is disposed tightly pressed between the inwardly annular part 72 and the partition member 11.

The assembly comprising the casing 7 and the module 10 can therefore be mounted and liquid-filled separately from the other parts of the anti-vibration support, before being fastened to the second rigid strength member 2. The tightness of the liquid chamber can therefore be checked before mounting the final assembly. The following parts, namely the membrane 9, the partition member 11, the elastomer wall 8, the washer 14, and the nut 15, are successively inserted through the opening of the first part 7A of the casing and displaced towards the second part 7B of the casing until they are settled in their final position. It should be noted that the shapes of the metal pieces of this assembly are formed before mounting the assembly.

Figure 2:
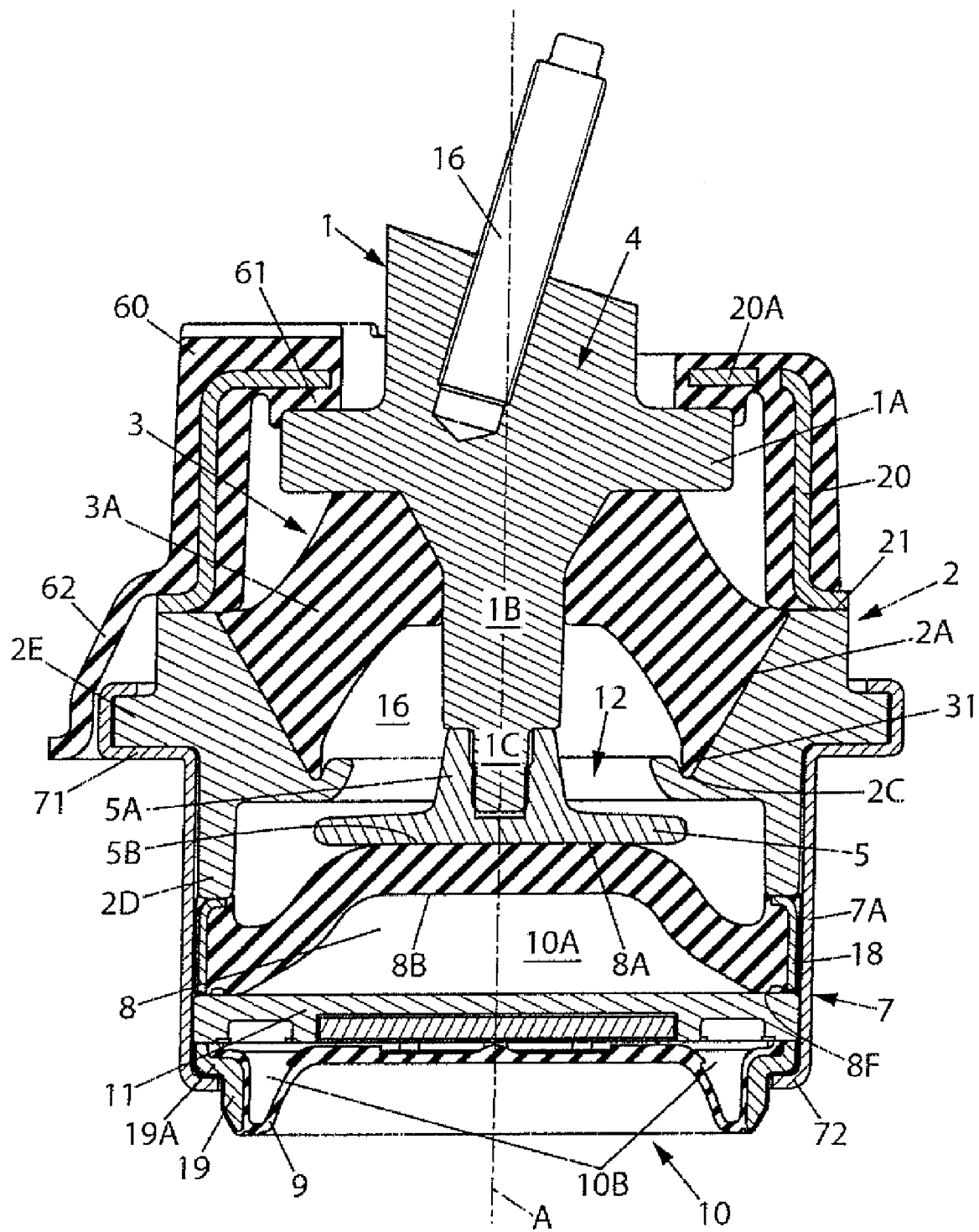
FIG. 2 is a longitudinal section view of a hydraulic anti-vibration support according to a second embodiment of the invention.

In the second embodiment shown in FIG. 2, a major difference compared to the first embodiment bears on the realization of the resilient means which limit the upward movement of the first rigid strength member. An upper casing 20 is disposed on the first side of the second rigid strength member 2 which faces the first rigid strength member 1, and is secured to said second strength member 2 so that a joint region 21 defines a peripheral path. The upper casing 20 has an annular top part 20A extending inwardly on which an elastomer layer 60 is moulded. Preferably, the moulding of the elastomer layer 60 is performed on most of the inner and outer surfaces of said upper casing to improve the thermal shielding obtained with this casing. Due to the elastomer-covered casing 20, the anti-vibration support of the second embodiment is preferred because it may withstand higher temperatures in comparison with the support of the first embodiment.

The elastomer layer 60 on one lateral outer side of the upper casing extends downwardly into an elastomer skirt 62 which provides a thermal shield for the lateral side of the second strength member 2 which is near a heat radiating source such as a collector for the exhaust pipe.

At least a part 61 of the elastomer layer 60 constitutes a second elastomer body forming the resilient means, and is adapted to be axially compressed between the annular top part 20A of the upper casing 20 and the annular part 1A of the first rigid strength member 1 when a distance between the first and second rigid strength members tends to a predetermined upper limit which corresponds to an upper end position for the displacement of the piston.

Preferably, a tubular part of the elastomer layer 60 covers the inside wall of the upper casing 20 substantially until the end part on the side of the joint region 21 and come in abutment against the main part 3A of the first elastomer spring body 3. Therefore, upon compression of the elastomer spring body 3, an upward (i.e. radially outward) sliding motion of the main part 3A relative to the frusto-conical inner wall 2A of the second rigid strength member 2 is insignificant or very limited. In this embodiment, the angle α which is defined between the conical direction of the main part 3A and the inner wall 2A may slightly exceed 90° when the elastomer spring body 3 accommodates a maximum load.

The end member 5 of the piston 4 has a substantially frusto-conical part 5A which is provided with a central bore adapted to fit to a protruding end part 1C of the rod 1B of the first rigid strength member 1. This end member 5 has a substantially discoid face 5B which is in non adhesive contact with an outer surface 8A of the central area of the elastomer wall 8.

Figure 4:
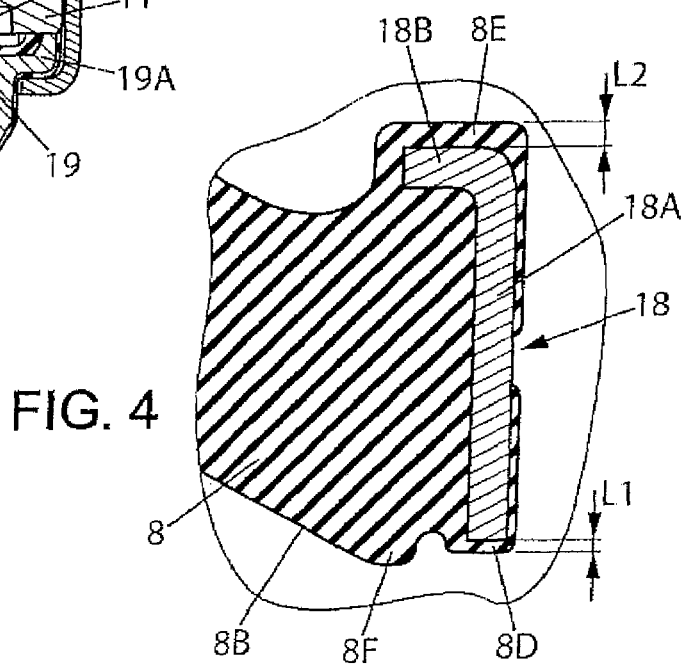
FIG. 4 is a detailed partial view of the peripheral area of the elastomer wall of the working chamber.

The elastomer wall 8 has a thickened peripheral area moulded on a rigid annular insert 18. This annular insert 18 has a tubular part 18A which is coaxial with the casing 7, one end of said tubular part extending radially inwards into a radial part 18B as shown in greater detail in FIG. 4. The radial thickness of the tubular part 18A is adapted to provide the stiffness which is required to withstand the outwards radial component of the load accommodated by the elastomer wall 8.

The dome-like shape of the elastomer wall 8 allows the piston 4 to reach an end downward position corresponding to a maximum load accommodated by the first elastomer spring body 3, in which position the inner face of the elastomer wall is almost flat and may be nearly in contact with the substantially flat surface of the partition member 11. Thus, the ratio of the volume of the damping liquid transferred from the working chamber to the compensation chamber and the corresponding course of the piston is high, which allows a much more efficient hydraulic damping than in the devices of the mentioned prior art (for a similar diameter of the working chamber).

A first layer 8D of elastomeric material of the elastomer wall 8 covers the other end of the tubular part 18A and has a thickness L1 which is inferior to the thickness L2 of a second layer 8E of elastomeric material of the elastomer wall covering the radial part 18B. The elastomer wall 8 partially illustrated in FIG. 4 corresponds to a non mounted piece, i.e. the elastomeric material is not compressed in the longitudinal direction. The inner face 8B of the peripheral area of the elastomer wall 8 has an annular bead 8F which protrudes longitudinally beyond the position of the first elastomeric layer 8D.

When the elastomer wall 8 is mounted inside the casing, a tubular part 2D of the second rigid strength member 2 comes in abutment against the second elastomeric layer 8E and compresses this layer. Consequently, the annular bead 8F is pressed against the partition member 11 and provides a main seal for the liquid. A security sealing may be provided by the first elastomeric layer 8D which is also pressed against the partition member 11, but normally there must no be any leak through the main seal. Because the thickness L1 of the first elastomeric layer 8D is small, the annular insert 18 is accurately positioned relative to the partition member 11.

The second rigid strength member 2 has two radial protrusions 2E extending outwardly which are substantially diametraly opposed relative to the main axis A. The casing 7 has top parts 71 extending radially outwards and which are fastened to each radial protrusion 2E, so that the casing 7 is secured to the second rigid strength member 2. The thickness parameter of the second elastomeric layer 8E of the elastomer wall 8 ensures that the tubular part 2D of the second rigid strength member 2 properly urge the annular insert 18 towards the partition member 11 when the casing 7 is secured to the second rigid strength member 2, thereby providing the adequate positioning of the insert 18 which is needed for the proper sealing of the annular bead 8F.

The elastomer membrane 9 which defines at least in part the liquid-filled compensation chamber 10B has a peripheral area moulded on an annular flange 19 substantially circular. This annular flange 19 has an outwardly extending shoulder 19A which is disposed between the partition member 11 and an inwardly extending annular part 72 of the casing 7.

Figure 3:
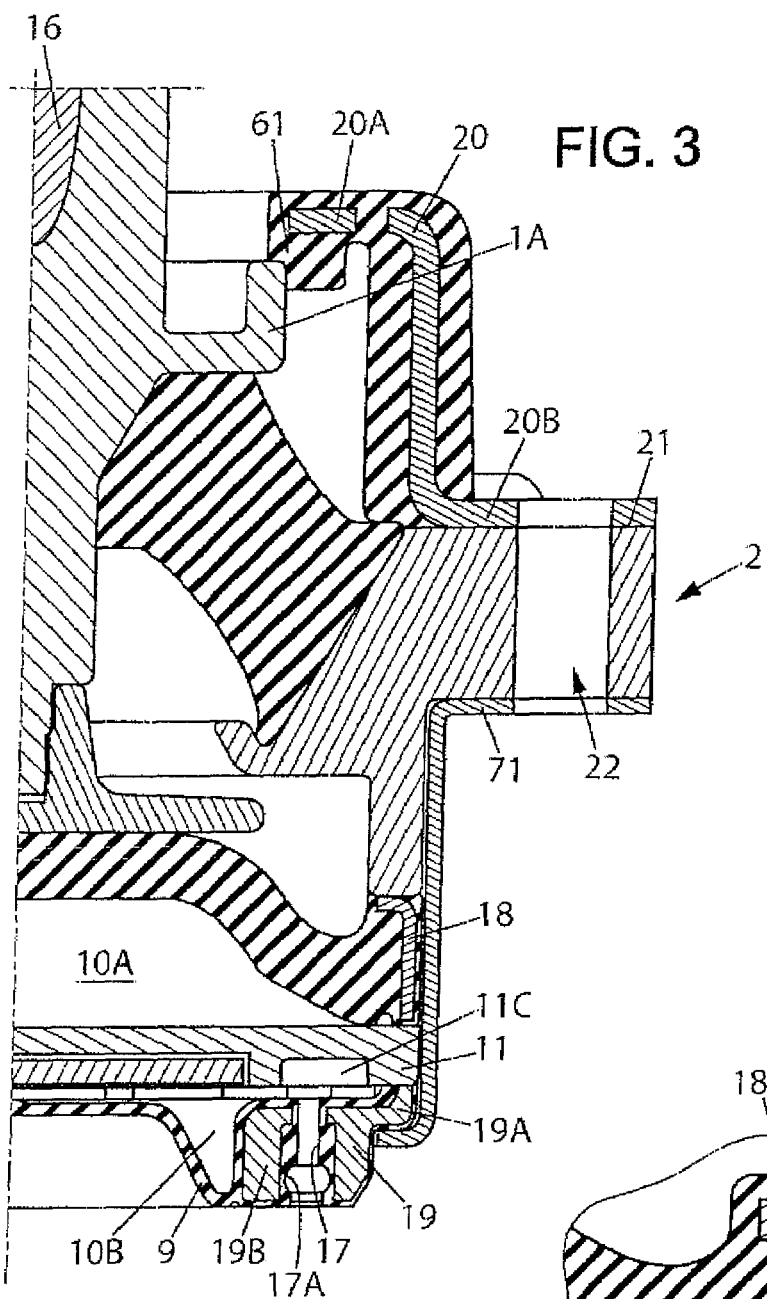
FIG. 3 is another longitudinal section view of the hydraulic anti-vibration support according to the second embodiment of the invention.

FIG. 3 is a partial longitudinal section view of the second embodiment of the hydraulic support, in which the section plane is turned by 90° round the main axis A compared to the section plane of FIG. 2. As shown in FIG. 3, the annular flange 19 is provided with an inwardly protruding lug 19B on which an elastomer layer is moulded and which defines a central bore 17 adapted to communicate with the chambers 10A and 10B of the module 10 via a channel 11C of the partition member 11. The main part of the central bore 17 is cylindrical, but an inlet end of the bore is formed by a spherical shaped portion 17B which is adapted to receive a plugging ball not shown. Once the chambers 10A and 10B have been filled with liquid, the plugging ball is forced into the spherical portion 17B and compresses the elastomer layer in the bore to obtain the required sealing.

The outer shapes of respectively a base 20B of the upper casing 20 and the second rigid strength member 2 have both a same ellipsoid shape, to have sufficient radial spaces to install fixation means in the two opposite oval ends. The section plane of FIG. 3 cuts the two oval ends. Each oval end is provided with a threaded bore 22. Each bore 22 is adapted to receive a bolt (not shown) which ensures securing the second rigid strength member 2 to the chassis of the vehicle and fastening the upper casing 20 and a top part 71 of the casing 7 to said strength member 2.

In a particular embodiment of the liquid-filled module 10 for either a first or a second embodiment of the invention here above described, the elastomer wall 8 is made of EPT (ethylene-propylene terpolymer) and the liquid essentially comprises a glycol. As the liquid-filled module is protected by the casing 7 which is remote from the heat source compared to the elastomer spring bodies 3 and 6, the temperatures to which the elastomer wall 8 is exposed can remain inferior to about 150° C. even though some upper parts of the support are exposed to temperatures around 200° C. This allows to use a glycol-based damping liquid for the module and to have an elastomer wall made of natural rubber or EPT, which is economically advantageous and is known to be chemically stable. Alternatively, a commonly available silicone-based material could be used for the elastomer wall, but such materials are not compatible with most glycol-based damping liquids and thus require special damping liquids which would increase the cost of the liquid-filled module.

As will be appreciated, the present invention does not limit itself to the embodiments described here above purely as examples; the invention also extends to other embodiments covered by the claims.

What is claimed is:

1. A hydraulic anti-vibration support for interconnecting first and second rigid elements that are to be united in order to damp and filter vibration between said elements at least along a main vibration axis, the support comprising:
   a first rigid strength member for securing to the first rigid element, including a piston which comprises a rod substantially disposed coaxially along the main axis and an end member disposed at the end of the rod remote from the first rigid element, said end member extending substantially radially perpendicular to the main axis;
   a second rigid strength member for securing to the second rigid element, having a first side which faces the first rigid strength member and a second side in the opposite direction relative to the main axis and being provided with an opening traversed by said piston;
   at least one first elastomer spring body made of a high temperature-resistant material and connecting the first and second rigid strength members, disposed on the first side of the second rigid strength member;
   a casing secured to the second rigid strength member and extending on the second side of said strength member; and
   a liquid-filled module mounted inside said casing, comprising:
      a liquid-filled working chamber delimited on a first side by a substantially dome shaped elastomer wall which has a central area in contact with the end member of the piston without any mechanical securing to said end member,
      a liquid-filled compensation chamber which is put into communication with the working chamber via a constricted passage,
      a partition member that separates said working and compensation chambers that includes said constricted passage.

2. A hydraulic anti-vibration support according to claim 1, wherein the first elastomer spring body includes a substantially frusto-conical main part which is in contact with the first and second rigid strength members and wherein the second rigid strength member includes abutment means which hold in place an inner annular edge part of said substantially frusto-conical main part upon compression of said first elastomer spring body.

3. A hydraulic anti-vibration support according to claim 2, wherein said substantially frusto-conical main part is in non-adhesive contact with the first and the second rigid strength members.

4. A hydraulic anti-vibration support according to claim 2, wherein said substantially frusto-conical main part of the first elastomer spring body is supported by a substantially frusto-conical inner wall of the second rigid strength member, and wherein said inner wall extends radially inwards into an annular recess which forms said abutment means.

5. A hydraulic anti-vibration support according to claim 3, wherein said substantially frusto-conical main part of the first elastomer spring body is supported by a substantially frusto-conical inner wall of the second rigid strength member, and wherein said inner wall extends radially inwards into an annular recess which forms said abutment means.

6. A hydraulic anti-vibration support according to claim 1, wherein the thickness of the substantially dome shaped elastomer wall is defined so that the load accommodated by said elastomer wall upon compression of the wall by the piston is adapted to maintain the central area of the wall always in abutment against the end member of the piston.

7. A hydraulic anti-vibration support according to claim 1, wherein the high temperature-resistant material constituting a first elastomer spring body comprises silicone.

8. A hydraulic anti-vibration support according to claim 1, wherein the high temperature-resistant material constituting a first elastomer spring body is able to withstand a prolonged exposure to temperatures above 160° C.

9. A hydraulic anti-vibration support according to claim 1, wherein the elastomer wall which delimits a first side of the liquid-filled working chamber has a thickened peripheral area moulded on a rigid annular insert.

10. A hydraulic anti-vibration support according to claim 9, wherein said annular insert has a tubular part which is coaxial with the casing, one end of said tubular part extending radially inwards into a radial part, and wherein a first layer of elastomeric material of the elastomer wall covering the other end of said tubular part has a thickness which is inferior to the thickness of a second layer of elastomeric material of the third elastomer body covering said radial part.

11. An elastomer wall for a hydraulic anti-vibration support according to claim 10, wherein the inner face of said peripheral area has an annular bead which in an uncompressed state protrudes longitudinally beyond the first layer of elastomeric material.

12. A hydraulic anti-vibration support according to claim 1, wherein the end member of the piston has a substantially frusto-conical part which is provided with a central bore adapted to fit to a protruding end part of the rod of the first rigid strength member, said end member further having a substantially discoid face which is in contact with an outer surface of the central area of the elastomer wall.

13. A hydraulic anti-vibration support according to claim 1, wherein the liquid-filled compensation chamber is defined at least in part by a second flexible wall which has a peripheral area moulded on an annular flange, said annular flange having an outwardly extending shoulder which is disposed between the partition member and an inwardly extending annular part of the casing.

14. A hydraulic anti-vibration support according to claim 13, wherein said annular flange is substantially circular and is provided with an inwardly protruding lug on which an elastomer layer is moulded and which defines a central bore adapted to communicate with the chambers of the module, and wherein a spherical part of said central bore is adapted to receive a plugging ball arranged for sealing said central opening once said chambers have been filled with liquid.

15. A hydraulic anti-vibration support according to claim 1, wherein the first rigid strength member includes an annular part substantially perpendicular to the main axis and which is formed in one piece with the rod of said first rigid strength member.

16. A hydraulic anti-vibration support according to claim 15, wherein an upper casing is disposed on the first side of the second rigid strength member and secured thereto, said upper casing having an annular part extending inwardly on which an elastomer layer made of a high temperature-resistant material is moulded, at least a part of said elastomer layer being adapted to be axially compressed between said annular part of the upper casing and the annular part of the first rigid strength member to prevent a distance between the first and the second rigid strength members from exceeding a predetermined upper limit.

17. A hydraulic anti-vibration support according to claim 16, wherein said elastomer layer is moulded on most of the inner and outer surfaces of said upper casing.

* * * * *